(12) United States Patent
Kim

(10) Patent No.: US 7,894,865 B2
(45) Date of Patent: Feb. 22, 2011

(54) FOLDABLE MOBILE COMMUNICATION TERMINAL HAVING A MODE SELECTOR BASED ON FOLDING ANGLE THEREOF

(75) Inventor: Ji-Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 814 days.

(21) Appl. No.: 11/468,487

(22) Filed: Aug. 30, 2006

(65) Prior Publication Data

US 2007/0060217 A1  Mar. 15, 2007

(30) Foreign Application Priority Data

Sep. 2, 2005 (KR) ...................... 10-2005-0081941

(51) Int. Cl.
*H04M 1/00* (2006.01)
(52) U.S. Cl. ................. 455/575.3; 455/569.1; D14/316
(58) Field of Classification Search ................ D14/316; 455/575.1–575.3, 569.1
See application file for complete search history.

(56) References Cited

U.S. PATENT DOCUMENTS

| | | | |
|---|---|---|---|
| 7,197,345 B2 * | 3/2007 | Kim et al. ................. | 455/575.3 |
| 2002/0198006 A1 * | 12/2002 | Hirayama et al. ........... | 455/456 |
| 2003/0194975 A1 * | 10/2003 | Nishiyama et al. ......... | 455/90.3 |
| 2006/0018102 A1 * | 1/2006 | Soderlund ................... | 361/752 |
| 2006/0056144 A1 * | 3/2006 | Tatsukami et al. .......... | 361/683 |
| 2006/0063416 A1 * | 3/2006 | Takagi ........................ | 439/394 |

FOREIGN PATENT DOCUMENTS

| | | | |
|---|---|---|---|
| CN | 1604729 A | | 4/2004 |
| WO | WO2004099957 | * | 11/2004 |
| WO | WO2005010379 | * | 3/2005 |

* cited by examiner

*Primary Examiner*—Nick Corsaro
*Assistant Examiner*—Quan M Hua
(74) *Attorney, Agent, or Firm*—Birch, Stewart, Kolasch & Birch, LLP

(57) ABSTRACT

A mobile communication terminal having a first body and a second body rotatably coupled by a hinge assembly, and a mode selector that sets an operation mode of the mobile communication terminal based on an angle between the first body and the second body. The mode selector includes a rotation part that enables the detection of an angle between the first body and the second body, and a setting part, movably mounted on the rotation part, which sets an operation mode of the mobile communication terminal corresponding to the detected angle when the setting part is moved into contact with a holding part.

17 Claims, 20 Drawing Sheets

FOLDABLE MOBILE COMMUNICATION TERMINAL HAVING A MODE SELECTOR BASED ON FOLDING ANGLE THEREOF

RELATED APPLICATION

The present disclosure relates to subject matter contained in priority Korean Application No. 10-2005-0081941, filed on Sep. 2, 2005, which is herein expressly incorporated by reference in its entirety.

BACKGROUND OF THE INVENTION

1. Field of the Invention

The present invention relates to a mobile communication terminal having a mode conversion device and a mode conversion method thereof.

2. Description of the Background Art

Generally, a conventional mobile communication terminal allows a user to make a voice call to another party using wireless communication.

Some conventional mobile communication terminals are constructed with two main parts, such as a main body and a cover. For example, there are folder-type terminals, in which a cover is connected to a main body via a hinge, slider-type terminals, in which a cover slides over a main body, and swivel-type terminals, in which a cover rotates in a perpendicular direction over a main body via a swivel.

Of these types of mobile communication terminals, the folder-type generally has the most efficient construction, and allows a larger display.

In a conventional folder-type mobile communication terminal, the main body typically includes a dialing button and various function keys, and the cover typically includes a main liquid crystal display (LCD) and sometimes a secondary LCD.

The covers of some conventional folder-type mobile communication terminals are capable of rotating up to 360° with respect to the main body.

With some conventional folder-type mobile communication terminals, an operation mode is automatically switched when a user opens (or closes) the cover.

Alternatively, an operation mode may be switched based upon a user pressing a function key. However, this is not that convenient for the user.

BRIEF DESCRIPTION OF THE INVENTION

In view of the foregoing, the present invention, through one or more of its various aspects, embodiments, and/or specific features or sub-components, is intended to bring out one or more of the improvements noted below.

One object of the present invention is to provide a mobile communication terminal which allows a user to conveniently select an operation mode after the mobile communication terminal is opened to various configurations.

Another object of the present invention is to provide a mobile communication terminal which allows a user to select and activate different modes of operation at each opened configuration.

Still another object of the present invention is to provide a mobile communication terminal which allows the user to lock or latch together certain portions of the mobile communication terminal to provide additional support at each opened configuration.

These objects can be achieved by providing a mechanism that allows a user to manually select a desired operation mode when the mobile communication terminal is in a certain configuration (or arrangement). When the user activates the selected operation mode by engaging a locking (or latching) element, this also provides extra structural support to maintain the particular configuration of the mobile communication terminal.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

One aspect of the present invention is the recognition by the present inventor of the problems associated with the related art. Based upon this recognition, the features of the present invention have been developed. As used hereafter, a mobile communication terminal may refer to various types of wireless communication devices, such as, but not limited to, cellular phones, mobile terminals, user equipment, PDAs, and the like.

The mechanism of the present invention serves the dual purpose of allowing a user to manually select and then activate a desired operation mode when the mobile communication terminal is opened (i.e., moved or set) to a certain configuration, while also providing added structural support to maintain the desired configuration upon activating the selected operation mode.

It should be noted that the operation mode may also be automatically detected and selected when the mobile communication terminal is opened (i.e., moved or set) to a certain configuration. In such case, activation of the selected operation mode would be performed by the user's manual control.

The mechanism may basically include a mode conversion device 300 (i.e., position fixation device, operation mode setting unit, etc.) that is operatively connected with a controller (i.e., microprocessor, CPU, etc.) and/or operation mode circuitry. The mode conversion device 300 may comprise a mode selector 310 (i.e., rotation dial, rotation part, rotary knob, movable switch, etc.), an operator 320 (i.e., fixation part, setting part, slide knob, movable latch, etc.), and a coupling member 330 (i.e., catching protrusion, holding part, stub, latch receiving part, etc.).

Described below are embodiments of a mode conversion device and mode selection (conversion) method of a mobile communication terminal according to the present invention.

Figure 1:
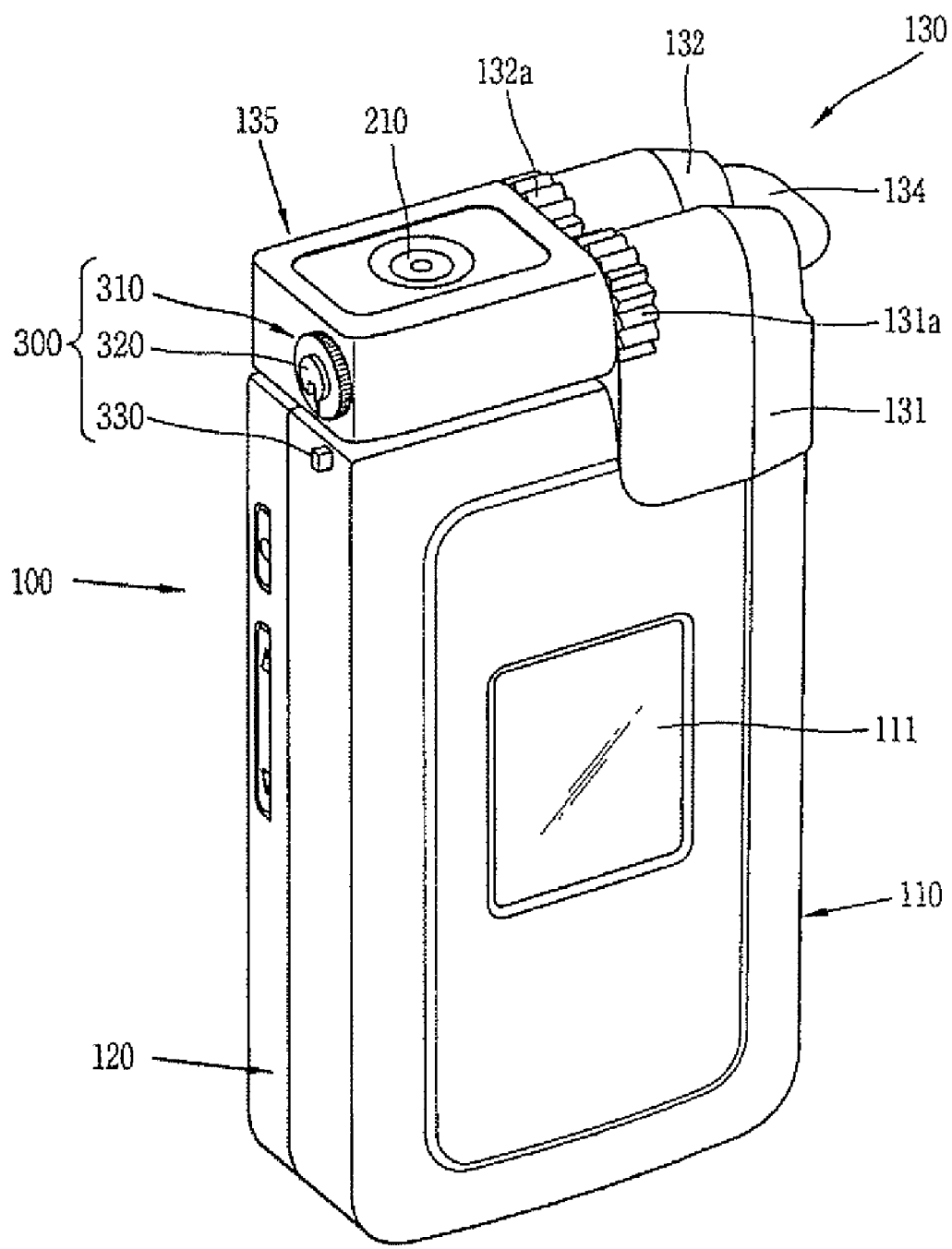
FIG. 1 is a perspective view of a mobile communication terminal according to an embodiment of the present invention.
Figure 2A:
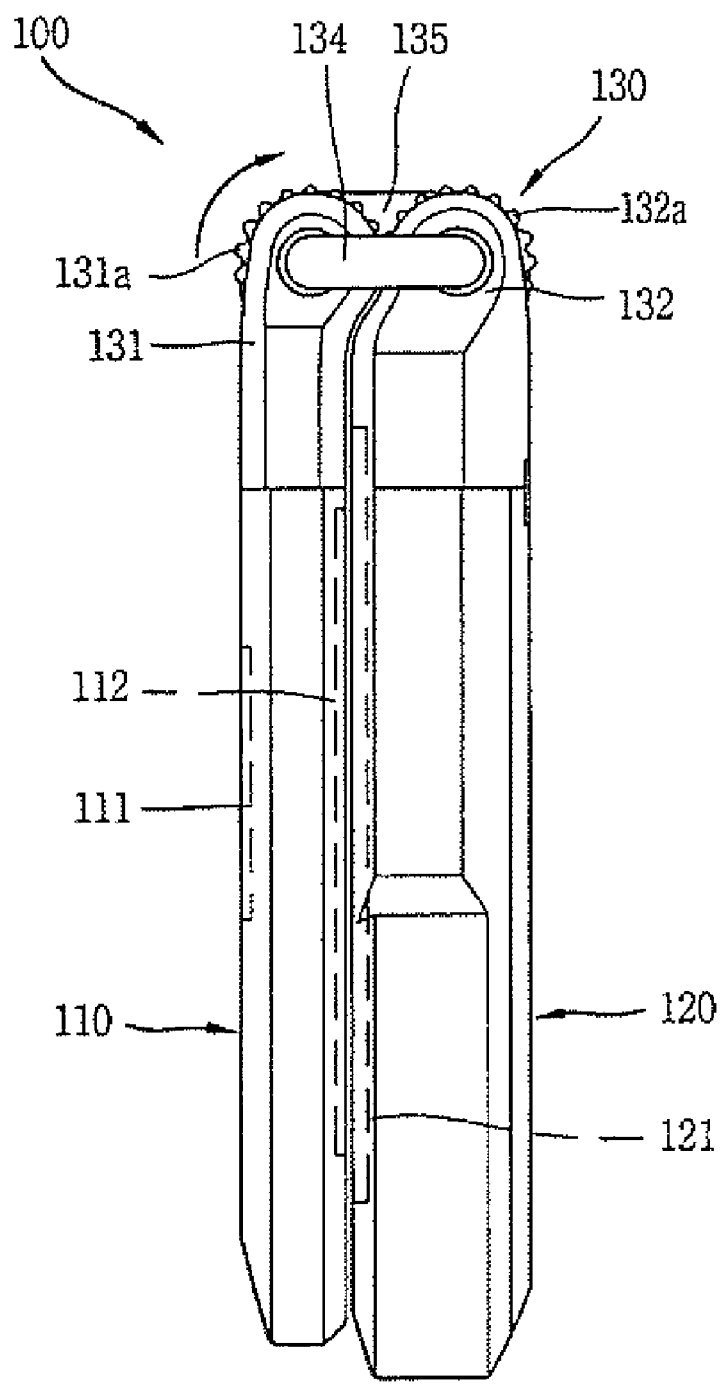
FIGS. 2A and 2B are side views of a mobile communication terminal according to an embodiment of the present invention.
Figure 2B:
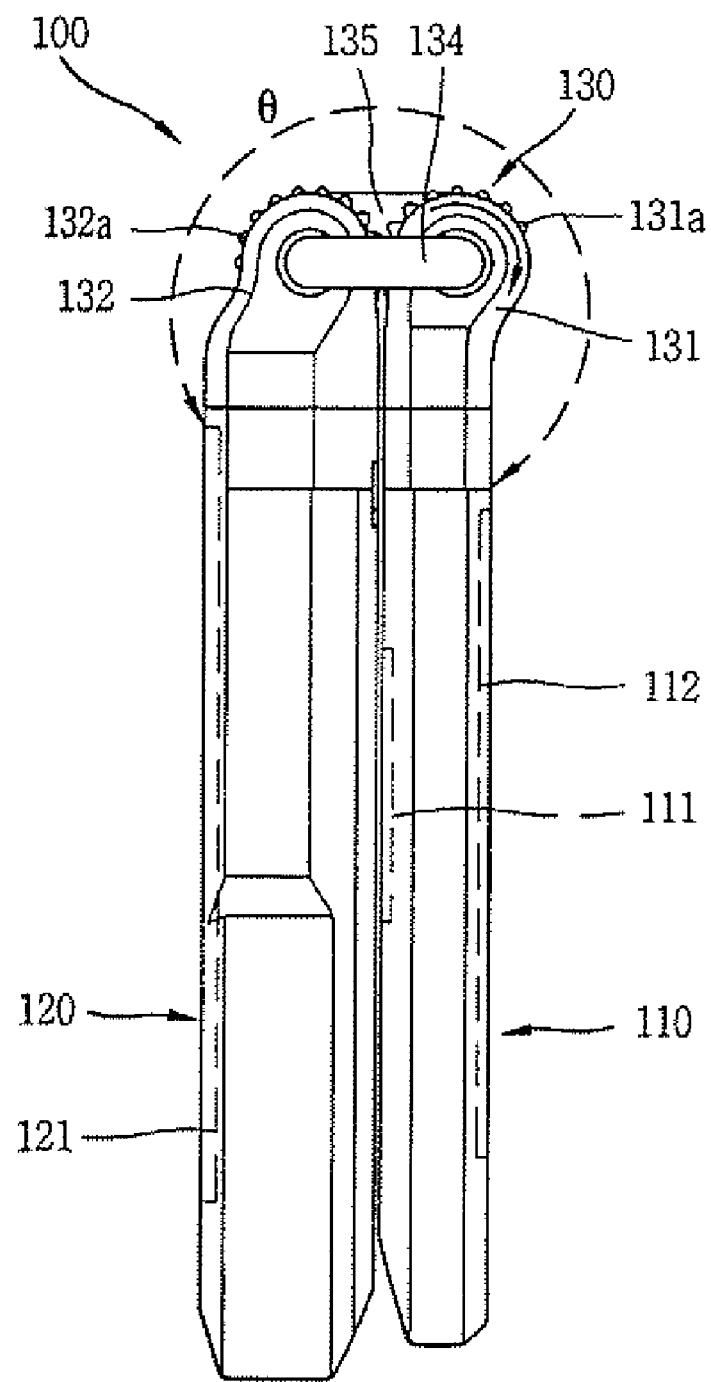
Figure 3:
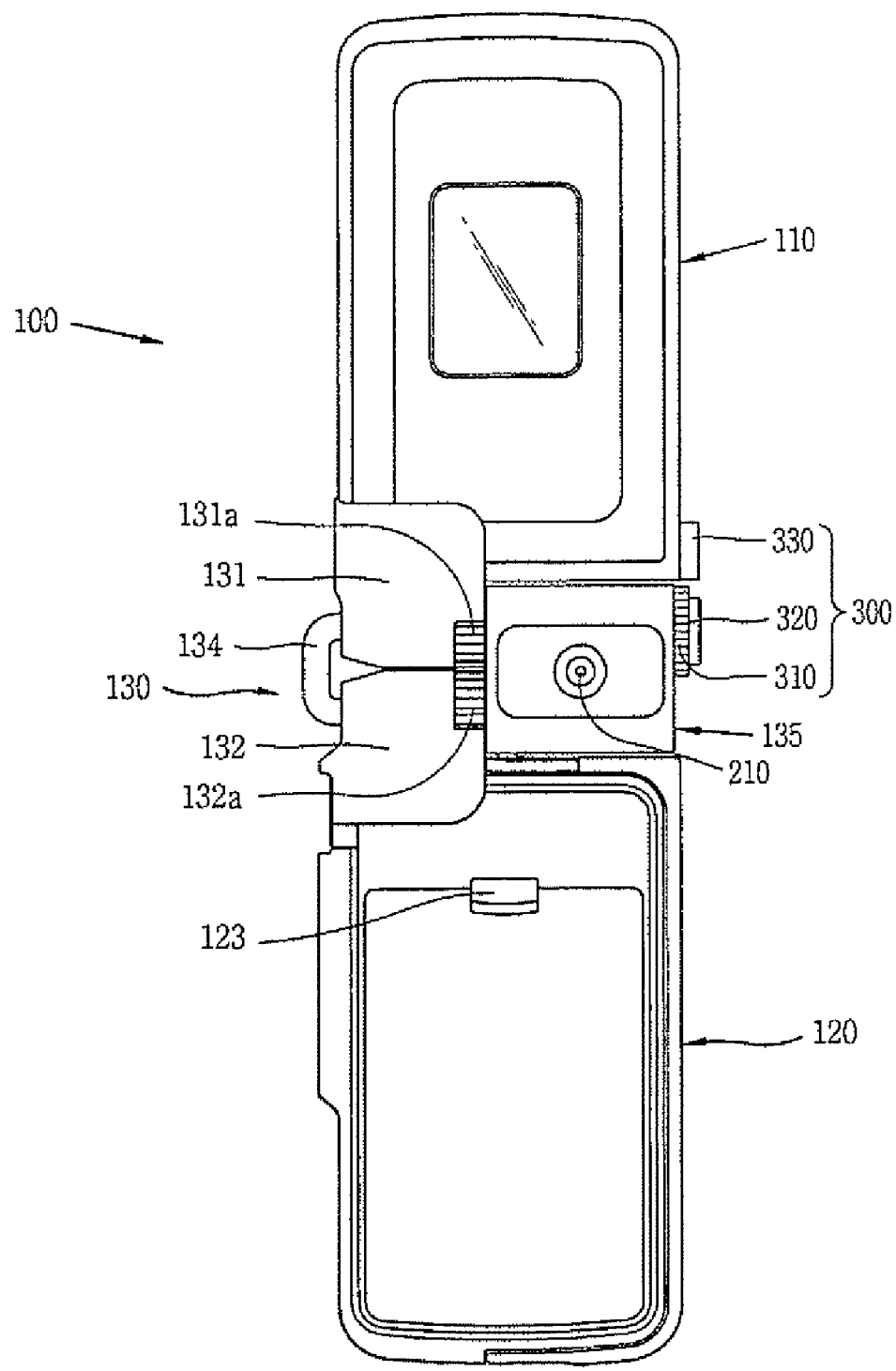
FIG. 3 is a rear view of a mobile communication terminal according to an embodiment of the present invention.

FIG. 1 is a perspective view of a mobile communication terminal according to an embodiment of the present invention. FIG. 2A shows a side view of the mobile communication terminal when it is in a closed state. FIG. 2B shows a side view of the mobile communication terminal when it is in a open state. FIG. 3 shows a back view of the mobile communication terminal when it is in an open state.

A construction of a mobile communication terminal 100 having a mode conversion device 300 is explained below with reference to FIGS. 1, 2A, 2B and 3.

The mobile communication terminal 100 shown in FIGS. 1, 2A, 2B and 3 includes a first body 120, which in some embodiments may include a key pad 121 (and/or other input devices), a second body 110, which in some embodiments may include a main liquid crystal display (LCD) 112 and, optionally, a secondary LCD 111, and a hinge assembly 130 that allows the first body 120 and the second body 110 to be moved with respect to each other (i.e., moved apart, unfolded, flipped over, rotated, swiveled, etc.).

The hinge assembly 130 includes a pair of couplers 131 and 132 which are coupled to ends of the second body 110 and the first body 120, respectively; gears 131a and 132a which are coupled to the couplers 131 and 132 by a link axis 134; and a fixing part 135 which prevents the gears 131a and 132a from separating from the couplers 131 and 132 and fixes the link axis 134. The hinge assembly allows the second body 110 to rotate up to about 360° with respect to the first body 120. In one embodiment, the fixing part 135 can include a camera module 210 and/or other electronic devices.

When the second body 110 is rotated 360° with respect to the first body 120, as shown in FIG. 2B, the key pad 121 of the first body 120 is located at one open face of the mobile communication terminal 100, and the main LCD 112 of the second body 110 is located at an opposite open face of the mobile communication terminal 100. A user may find this position convenient for viewing information displayed on the main LCD 112, such as image information.

A mode conversion device 300 which controls an operation mode of the mobile communication terminal 100 (such as, but not limited to, a display mode) by cooperating with a controller (CPU) is provided at an end of the mobile communication terminal 100 in the vicinity of the hinge assembly 130. When the second body 110 is rotated at a certain angle with respect to the first body 120, the mode conversion device 300 is capable of holding the second body 110 in a position to maintain the certain angle between the second body 110 and the first body 120.

The mode conversion device 300 may comprise a mode selector 310 and an operator 320. The mode selector 310 may be mounted at the hinge assembly 130, and allows a user to select an operation mode when the mobile communication terminal 100 is in a certain configuration (i.e., the first body 120 and/or the second body 110 may be moved (rotated, unfolded, flipped around, etc.) about the hinge assembly 130). The operator 320 may be operatively connected with the mode selector 310, and allows activation of an operation mode that was selected by the user upon adjusting the mode selector 310. That is, the operator 320 (in cooperation with the microprocessor) may act as an operation mode activating switch.

A coupling member 330 can be mounted at an end of at least one of the first body 120 and the second body 110 adjacent to the hinge assembly 130. When a user moves the operator 320 for engagement with the coupling member 330, the operation mode selected by adjusting the mode selector 310 is then activated. Thus, when the operator 320 is engaged with the coupling member 330, the operation mode previously selected by the user who adjusted the mode selector 310 is then activated and also, extra structural support to maintain the desired configuration of the mobile terminal (i.e., a closed or opened configuration) can be achieved.

Figure 4:
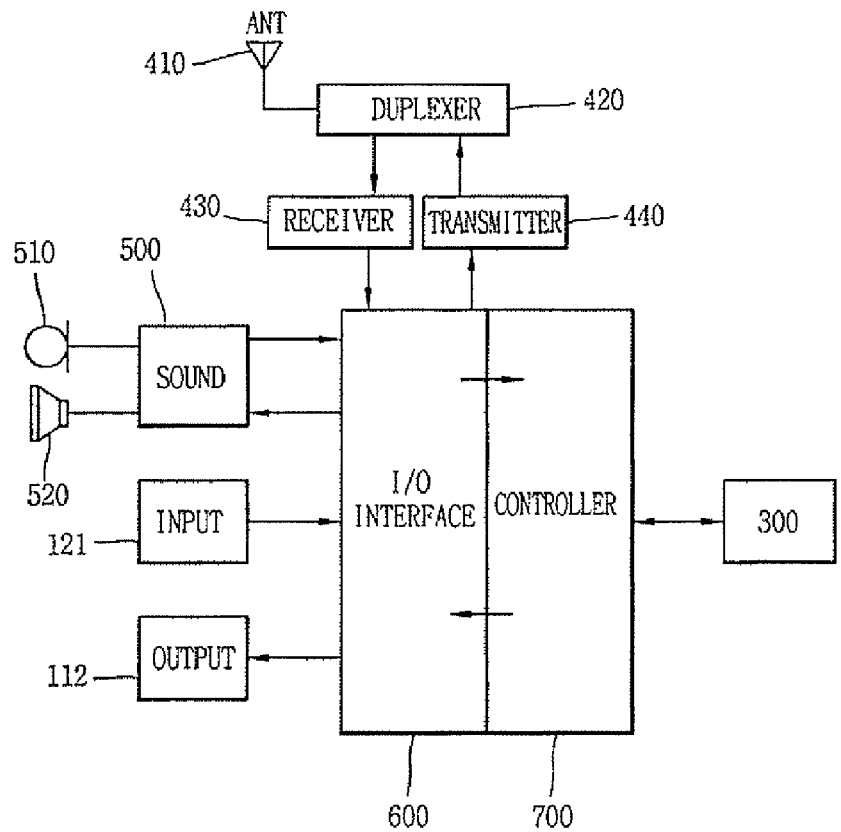
FIG. 4 is a block diagram of a mobile communication terminal according to an embodiment of the present invention.

FIG. 4 is a block diagram of a mobile communication terminal 100 according to an embodiment of the present invention. The mobile communication terminal 100 shown in FIG. 4 includes an antenna 410, and a controller 700 which is connected to an I/O interface 600.

A user provides input signals to the controller 700 via an input device such as the key pad 121. To transmit data, the controller 700 provides signals to a transmitter 440, which transmits signals to a node in a wireless network, such as a base station or satellite, via a duplexer 420 and an antenna 410 of the mobile communication terminal 100. When data is received from a wireless network, signals are received by a receiver 430 via the antenna 410 and duplexer 420, and are provided to the controller 700. The controller 700 provides output data to an output device such as a main LCD 112 or sub LCD 111. The controller 700 also receives voice signals from a microphone 510, and provides output sounds via a speaker 520.

The speaker 520, input device 121 and output device 112 operate in accordance with the operation mode set in the mobile communication terminal 100. Various operation modes of a mobile communication terminal 100 according to the present invention is may be set based upon different configurations in which the second body 110 is open with respect to the first body 120.

Figure 5:
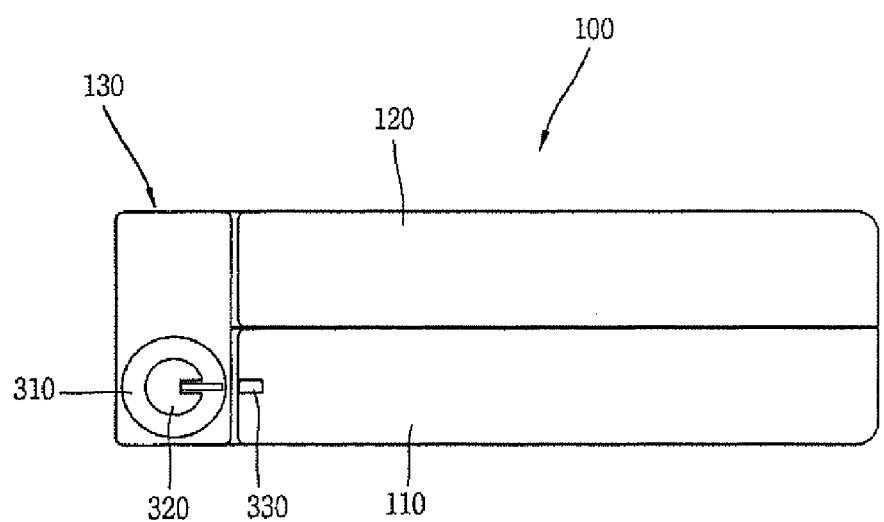
FIG. 5 is a side view of a mobile communication terminal according to an embodiment of the present invention.

FIG. 5 is a side view of a mobile communication terminal 100 according to an embodiment of the present invention.

As shown in FIG. 5, in an embodiment in which the coupling member 330 is provided on the second body 110, the mode selector 310 and the operator 320 are provided on a side of the hinge assembly 130 which is adjacent to the second body 110. The coupling member 330 is provided at an end of the second body 110 adjacent to the mode selector 310 and the operator 320.

In an embodiment in which the coupling member 330 is provided on the first body 120, rather than the second body 110, the mode selector 310 and the operator 320 are provided on a side of the hinge assembly 130 which is adjacent to the first body 120, rather than the second body 110.

FIGS. 6 through 9 illustrate a construction of a mode conversion device 300 according to an exemplary embodiment of the present invention.

Figure 6:
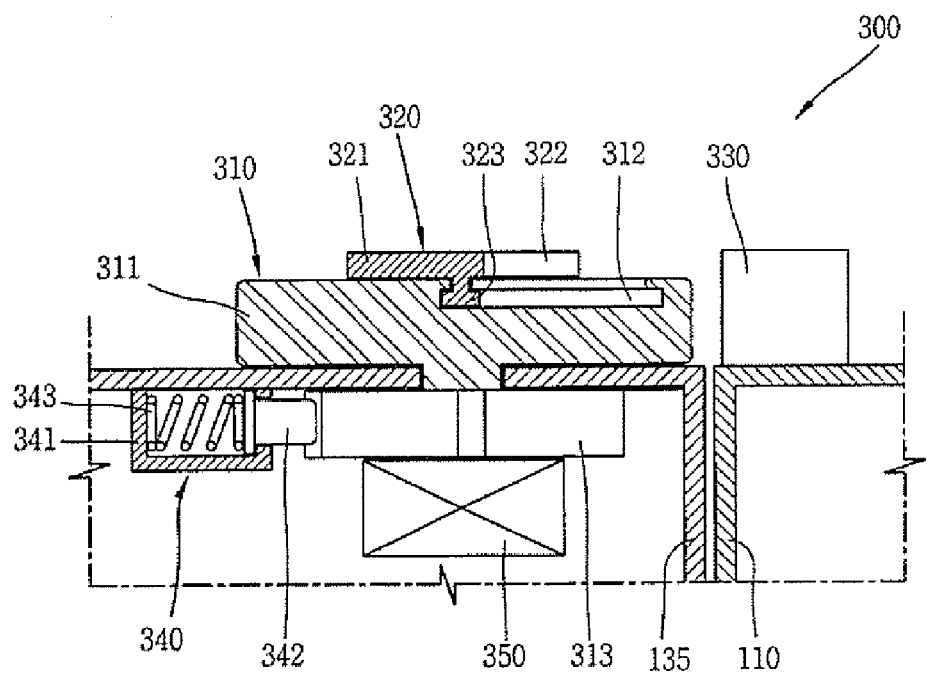
FIG. 6 shows a construction of a mode conversion device according to an embodiment of the present invention.

In the embodiment shown in FIG. 6, the mode selector 310 and the operator 320 are mounted on the fixing part 135 of the hinge assembly 130. In this embodiment, the coupling member 330 is mounted on the second body 110, and the mode selector 310 and the operator 320 are mounted on an end of the fixing part 135 adjacent to the second body 110.

Figure 7:
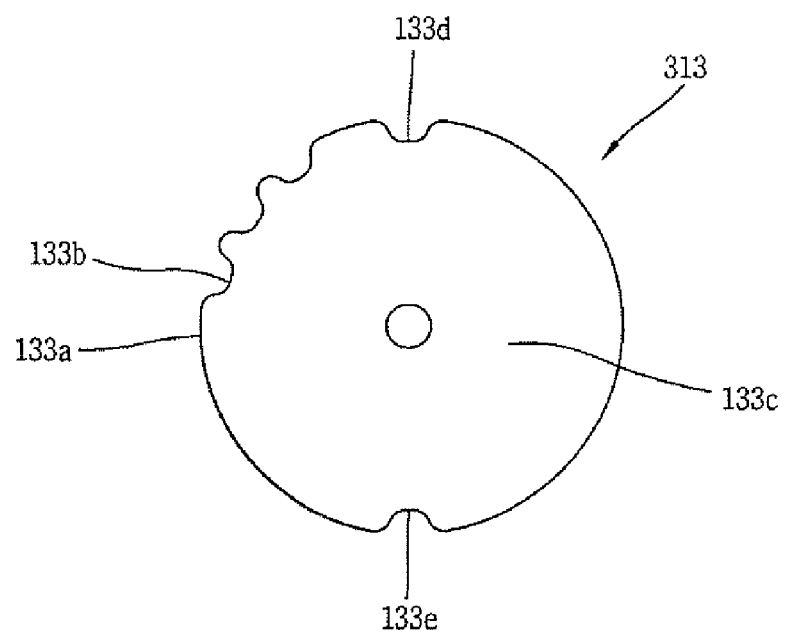
FIG. 7 shows a mode conversion device according to an embodiment of the present invention.

In the illustrated embodiment, the mode selector 310 is formed in the shape of a disk (or knob), and is coupled to a rotation angle control member 313 via a central shaft. As shown in FIG. 7, the rotation angle control member 313 has a gear-like shape, and includes protrusions 133a and grooves 133b. The shape and placement of the protrusions 133a along the outside of the rotation angle control member 313 correspond to angles at which the second body 110 can be fixed with respect to the first body 120.

For example, in one embodiment, three grooves 133b may be provided on the rotation angle control member 313 to allow the second body 110 to be fixed with respect to the first body 120 at three open angles (such as 140°, 160° and 170°). Two opposing groves (133d and 133e) may also be provided on the rotation angle control member 313 to allow the second body 110 to be fixed with respect to the first body 120 at approximately 180° and 360°, respectively.

The grooves 133b hold the mode selector 310 at a position by engaging with a detent 342 of a stopper 340, which is described below in more detail. The grooves 133b can be formed to have the same width. The stopper 340 is provided at a position adjacent to the rotation angle control member 313.

In the embodiment illustrated in FIG. 6, the stopper 340 includes an elastic member 343, such as a coil spring, provided in a case 341. The detent 342 is provided in the case 341, and protrudes through an opening of the case 341. One end of the detent 342 abuts the elastic member 343.

The elastic member 343 urges the detent 342 outwards towards the rotation angle control member 313, whereas the protrusions 133a of the rotation angle control member 313 urge the detent 342 inwards towards the case 341. The outward force provided by the elastic member 343 causes the detent 342 to engage with the grooves 133b of the rotation angle control member 313 as it is is rotated.

Thus, the stopper 340 can hold the rotation angle control member 313 and the mode selector 310 at angles corresponding to the positions of the grooves 133b.

The mode conversion device 300 also includes a sensor 350 which detects the angle by which the rotation part 310 rotates. The sensor 350 can be implemented, for example, with a plurality of switches. The sensor 350 is connected to the controller 700 to provide a detected rotation angle of the mode selector 310 to the controller 700.

The operator 320 is mounted on the mode selector 310. When a user slides the operator 320 over to engage with the coupling member 330 in a set position, the operator 320 activates (in cooperation with the controller 700) an operation mode of the mobile communication terminal 100, and may also holds the mobile communication terminal 100 at an open angle.

A slot 312 is provided in a body 311 of the mode selector 310, to allow the operator 320 to slide across the mode selector 310. The slot 312 is positioned to run from a center of the body 311 to an end of the body 311. The slot 312 is provided with a protrusion (not shown) that prevents a slider 322 of the setting part 320 from separating from the slot 312 in an upward direction.

Figure 8:
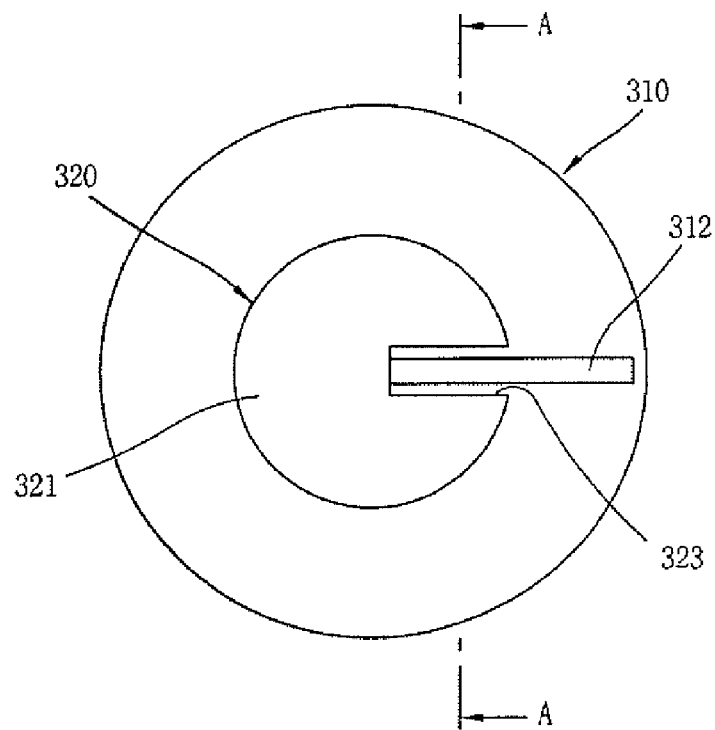
FIG. 8 shows a mode conversion device according to an embodiment of the present invention.
Figure 9:
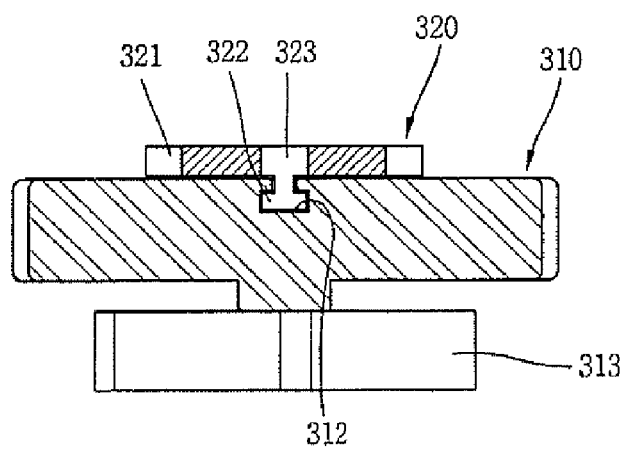
FIG. 9 is a sectional view taken along line 'A-A' of FIG. 8.

In the embodiment illustrated in FIG. 8, the operator 320 includes a circular plate body 321 which is smaller than the mode selector 310. FIG. 9 is a sectional view taken along line 'A-A' of FIG. 8. A groove 323 is formed on a side of the circular plate body 321 facing the coupling member 330. The width of the groove 323 corresponds to the width of the coupling member 330, so that the coupling member 330 can fit into the groove 323 to engage the operator 320 with the coupling member 330. The slider 322 of the operator 320, which mounts in the slot 312 of the mode selector 310I is provided at a lower center of the body 321. The slider 322 is shaped to correspond to the shape of the slot 312, and slides therein.

Figure 10A:
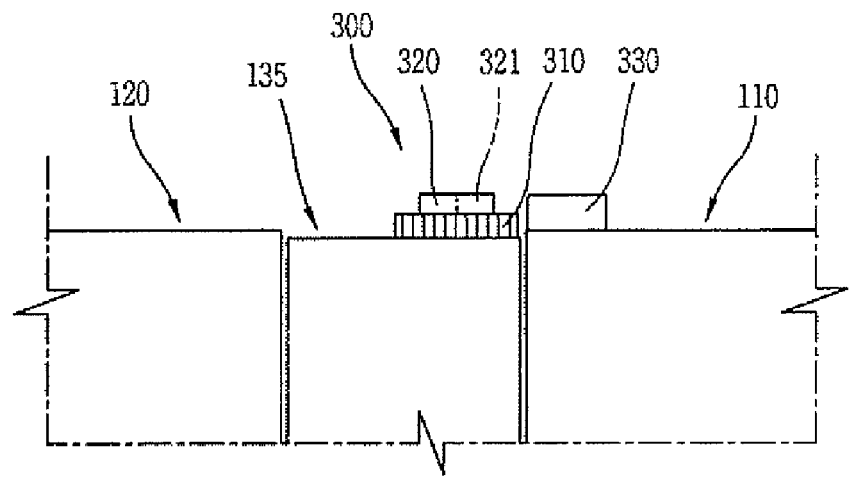
FIGS. 10A and 10B shows side views of a mode conversion device according to an embodiment present invention.
Figure 10B:
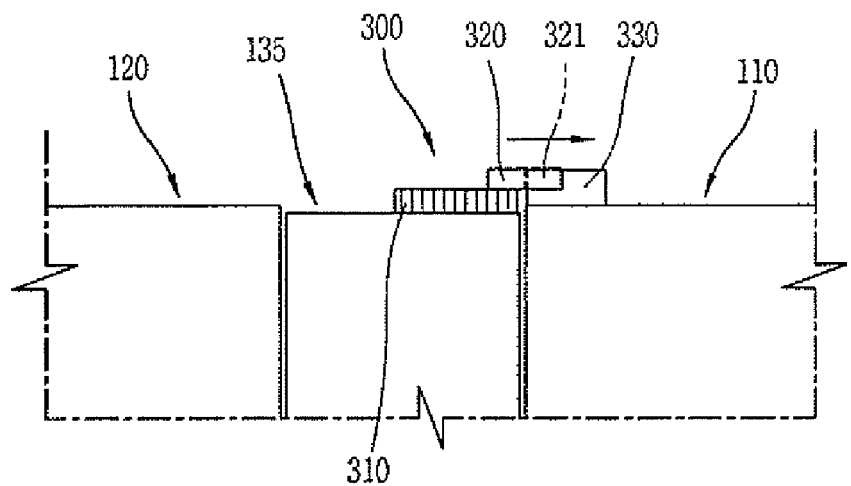
Figure 11A:
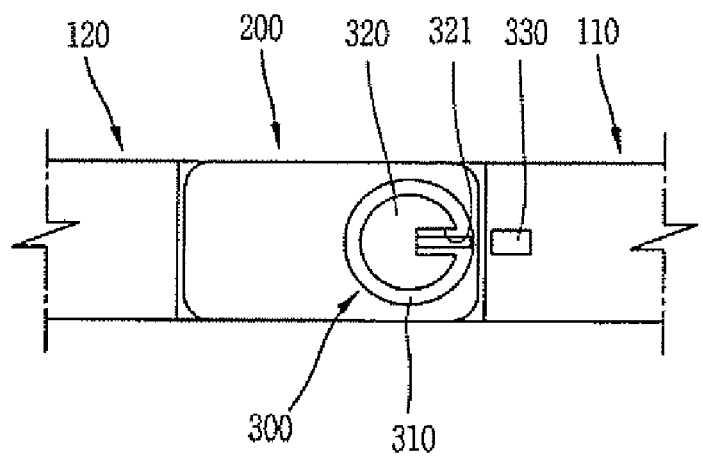
FIGS. 11A and 11B show top views of a mode conversion device according to an embodiment of the present invention.
Figure 11B:
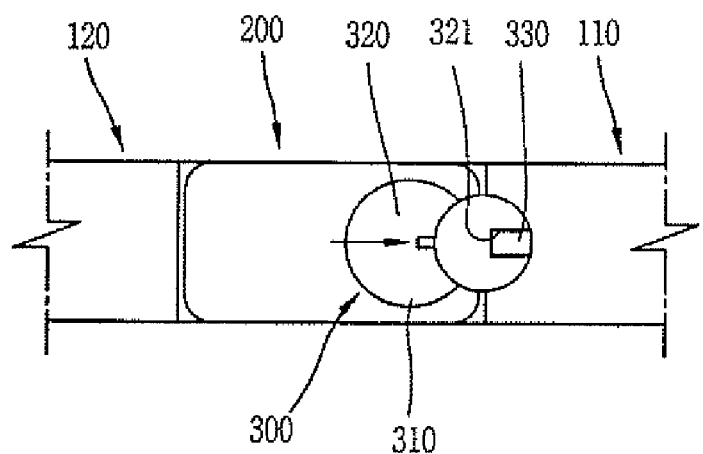

FIGS. 10A and 10B show side views of the mode conversion device 300. FIGS. 11A and 11B show top views of the mode conversion device 300. FIGS. 10A and 11A show the position of the operator 320 before it engages with the coupling member 330. FIGS. 10B and 11B show the position of the operator 320 when it is engaged with coupling member 330.

The coupling member 330 or the operator 320 are capable of detecting when they come into contact with each other. In this regard, the coupling member 330 and the operator 320 can be two parts of an electric switch, such as a contact switch. That is, when a user slides the operator 320 into contact with the coupling member 330, the switch is closed, and a signal is sent to the controller 700 to set the mobile communication terminal into an operation mode.

Figure 12A:
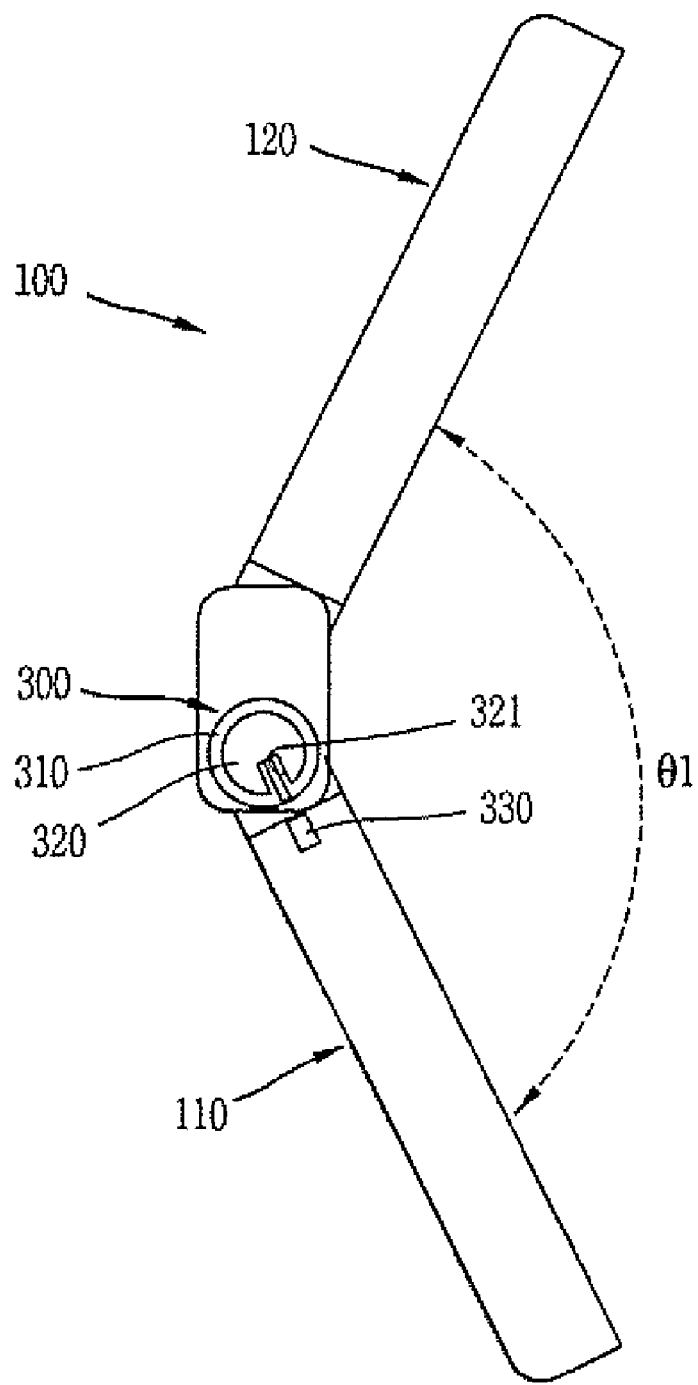
FIGS. 12A to 12C shows side views of a mobile communication terminal according to an embodiment of the present invention.
Figure 12B:
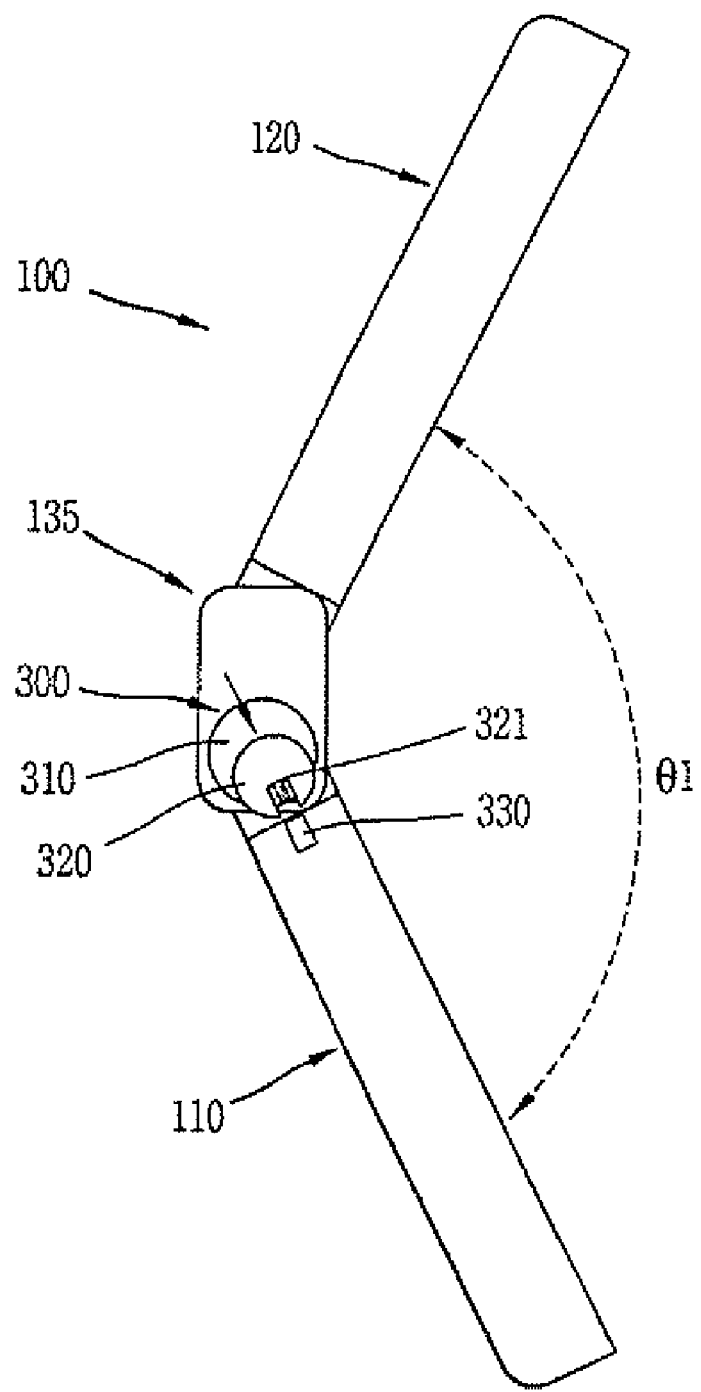
Figure 12C:
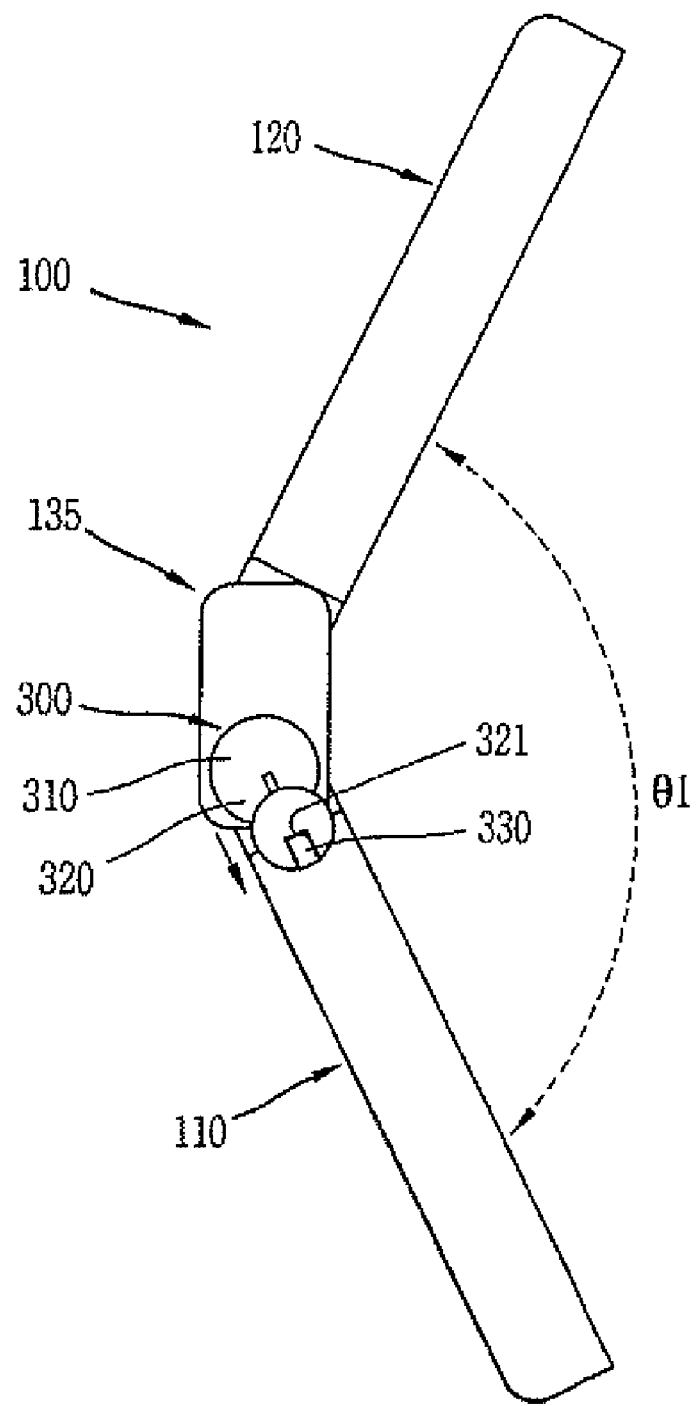

FIGS. 12A to 12C show a view of a mobile communication terminal 100 when a second body 110 is opened with respect to the first body 120 by an angle of θ1.

FIG. 12A shows the mobile communication terminal 100 when the second body 110 is initially rotated by an angle θ1. FIG. 12B shows the mobile communication terminal 100 as a user begins to slide the operator 320 towards the coupling member 330. FIG. 12C shows the mobile communication terminal 100 as the operator 320 is fully engaged with the coupling member 330. When the operator 320 contacts the coupling member 330, a signal is sent to the controller 700 to set the mobile communication terminal 100 to an operation mode.

Figure 13A:
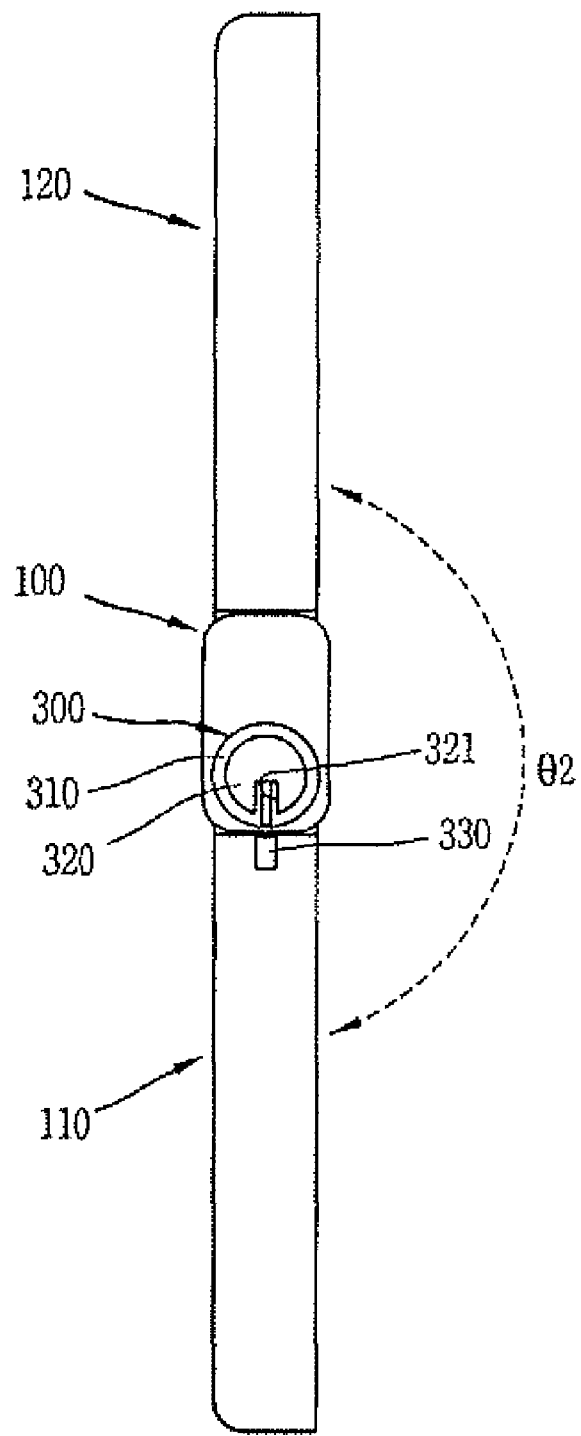
FIGS. 13A to 13C show side views of a mobile communication terminal according to an embodiment of the present invention.
Figure 13B:
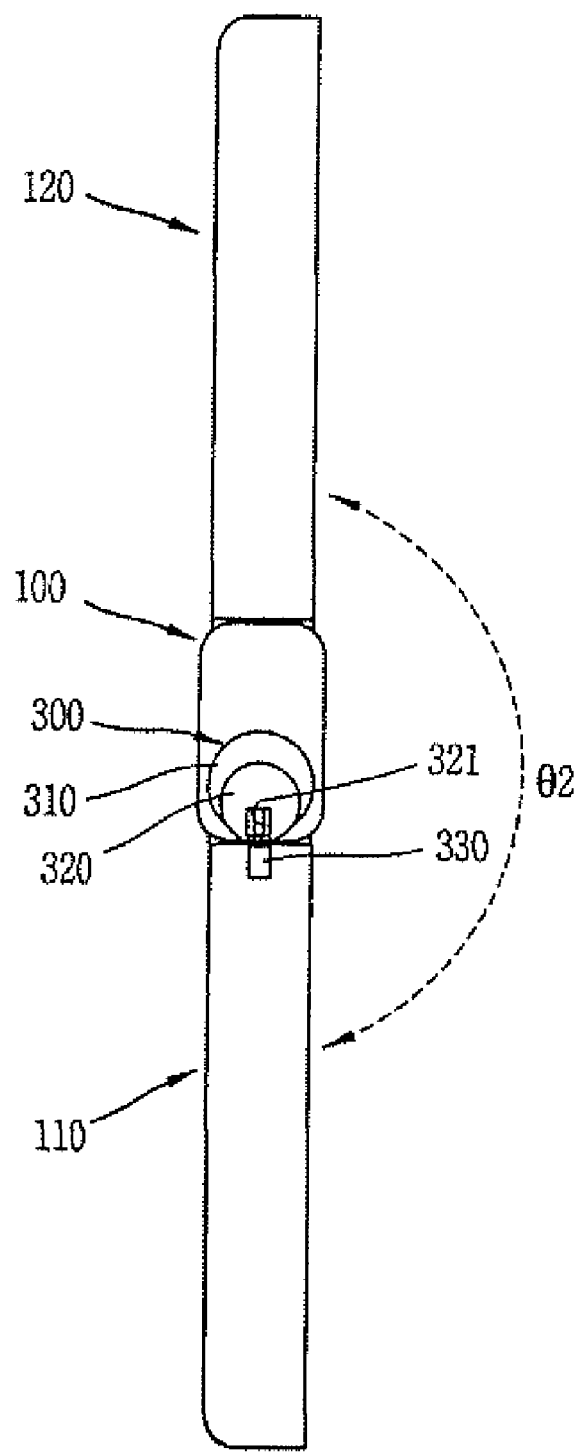
Figure 13C:
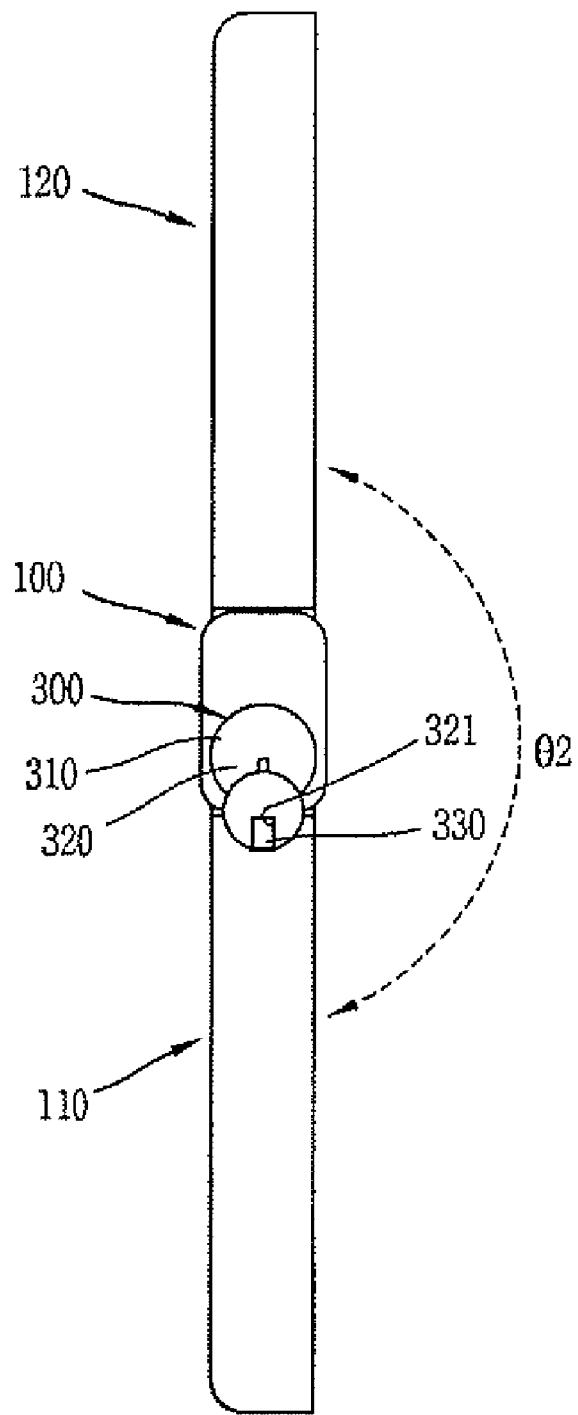

FIGS. 13A to 13C show a mobile communication terminal 100 when a second body 110 is opened with respect to the first body 120 by an angle of θ2. FIG. 13A shows the mobile communication terminal 100 when the second body 110 is initially rotated by an angle θ2. FIG. 138 shows the mobile communication terminal 100 as a user begins to slide the operator 320 towards the coupling member 330. When a user slides the operator 320 into contact with the coupling member 330, as shown in FIG. 13C, a signal is sent to the controller 700 to set the mobile communication terminal 100 to an operation mode.

Figure 14A:
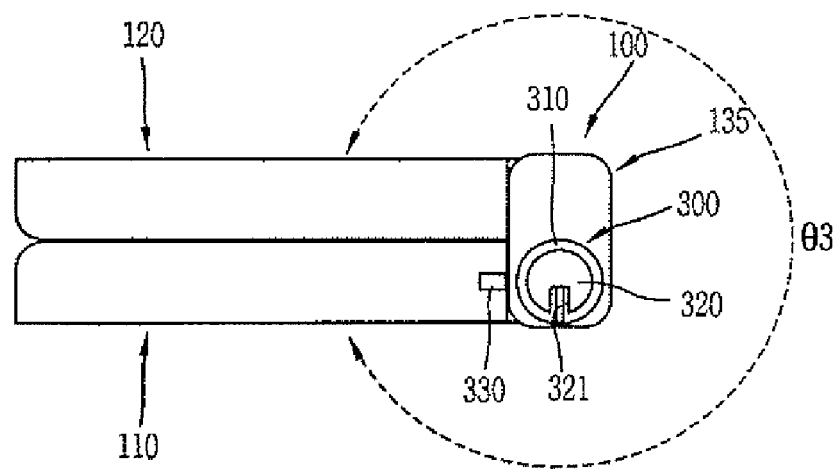
FIGS. 14A to 14C show side views of a mobile communication terminal according to an embodiment of the present invention.
Figure 14B:
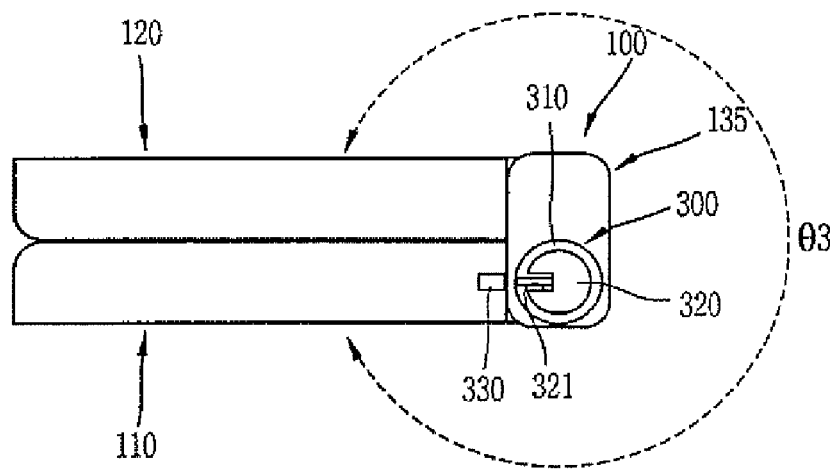
Figure 14C:
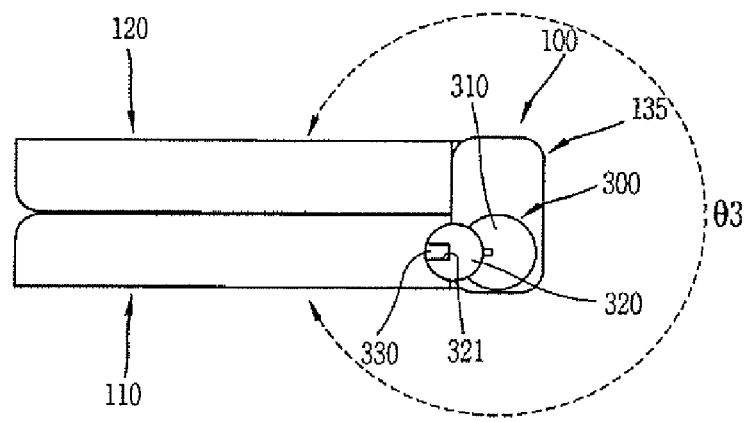

FIGS. 14A to 14C show a mobile communication terminal 100 when a second body 110 is opened with respect to the first body 120 by an angle of θ3. FIG. 14A shows the mobile communication terminal 100 when the second body 110 is initially rotated by an angle θ3. FIG. 14B shows the mobile communication terminal 100 as a user begins to slide the operator 320 towards the coupling member 330. When a user slides the operator 320 into contact with the coupling member 330, as shown in FIG. 14C, a signal is sent to the controller 700 to set the mobile communication terminal 100 to an operation mode.

As mentioned above, when a user slides the operator 320 into engagement with the coupling member 330, this not only holds the second body 110 open at fixed position with respect to the first body 120, but also signals the controller 700 to set an operation mode corresponding to the rotation angle of the mode selector 310.

The mobile communication terminal 100 can be programmed to operate in different operation modes for each different open angles of the second body 110. For example, the mobile communication terminal 100 may be programmed to operate in an initial mode if the angle is θ1, operate in a camera mode if the angle is θ2, and operate in a signal reception mode if the angle is θ3.

In an initial mode, a user could enter into a calling mode by pressing a predetermined key. In a signal reception mode, the mobile communication terminal 100 can receive data from one of a TV broadcast provider, multimedia contents provider, internet service provider or other wireless communication network, for example.

Figure 15:
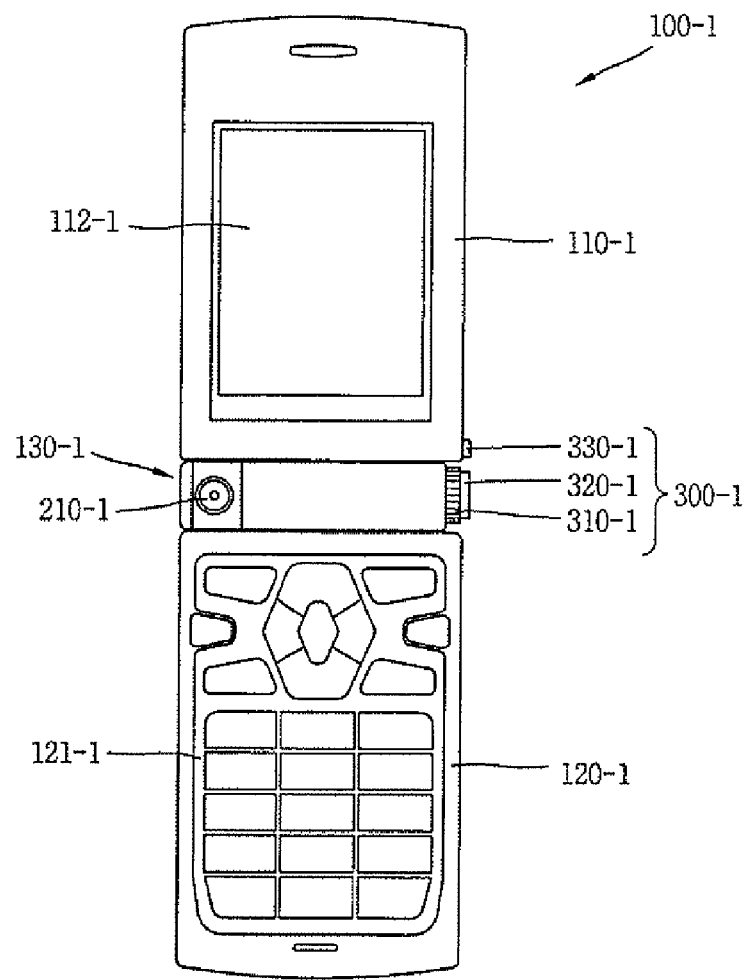
FIG. 15 shows a mobile communication terminal according to an embodiment of the present invention.

FIG. 15 shows a mobile communication terminal 100-1 having a hinge assembly 130-1 according to another embodiment of the present invention. The mobile communication terminal 100-1 includes a first body 120-1 and a second body 110-1, which are rotatably coupled to each other by the hinge assembly 130-1. In some embodiments, the second body 110-1 can include a main LCD, and the first body 120-1 can include a keypad 121-1.

In the embodiment shown in FIG. 15, a mode conversion device 300-1 is mounted at one end of the hinge assembly 130-1. The mode conversion device 300-1 includes a mode selector 310-1, a operator 320-1, and a coupling member 330-1. Since the mode selector 310-1, a operator 320-1, and a coupling member 330-1 may have the same constructions as described above, they are not explained in further detail here.

Figure 16A:
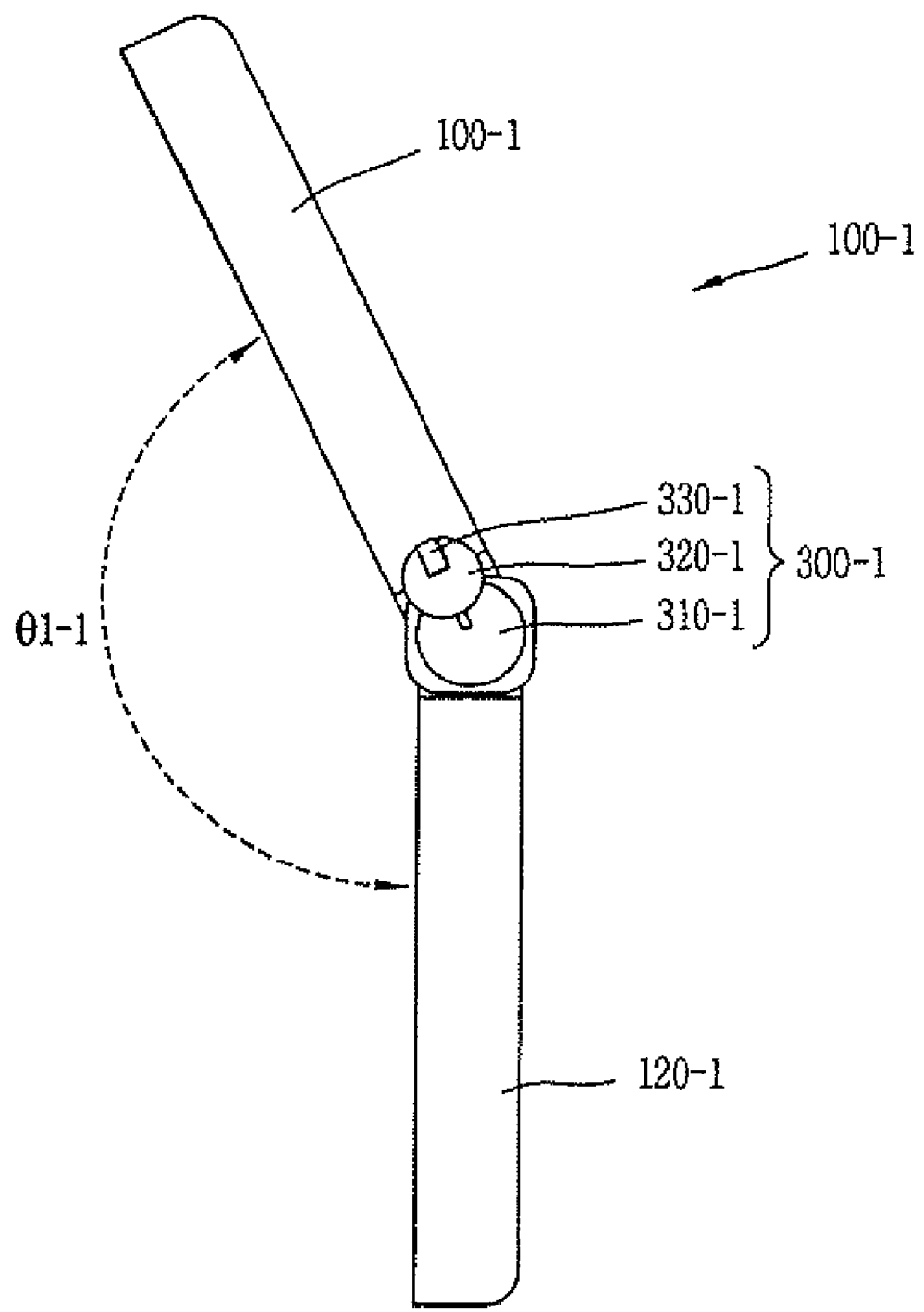
FIGS. 16A to 16C show side views of a mobile communication terminal according to an embodiment of the present invention.
Figure 16B:
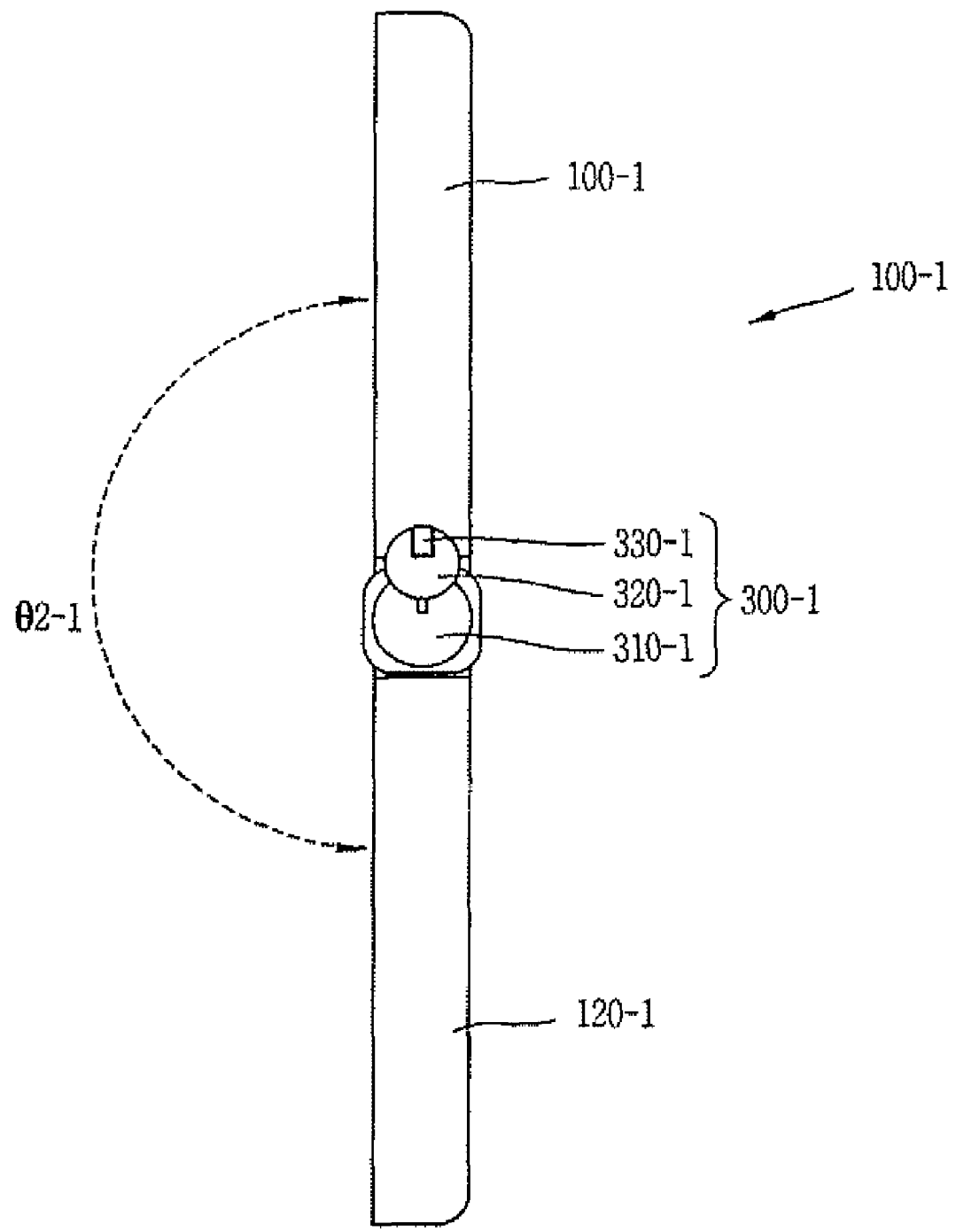
Figure 16C:
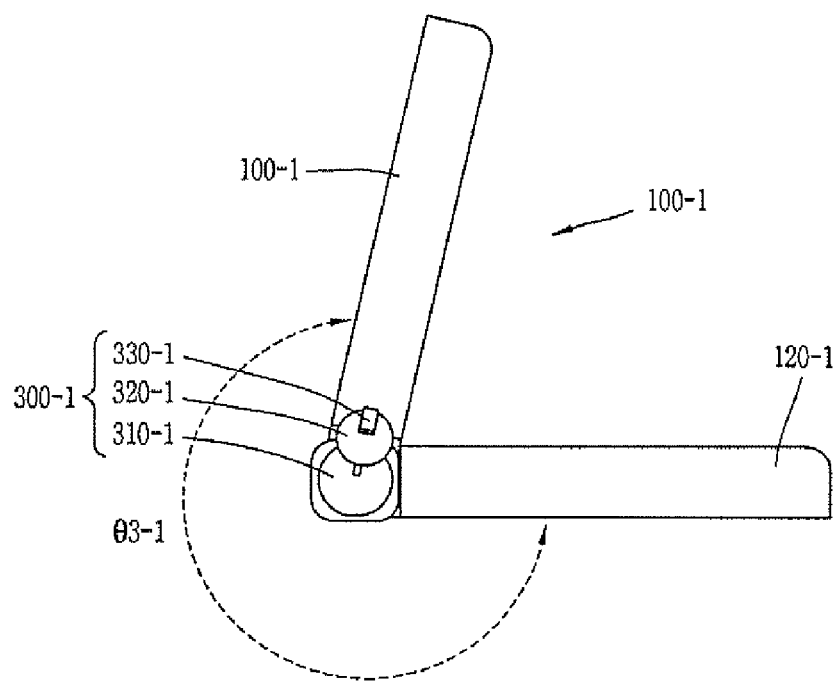

FIGS. 16A to 16C show side views of the mobile communication terminal 100-1. FIG. 16A is a view of the mobile communication terminal 100-1 when it is opened by an angle of θ1-1, in the range of 140° to 160°. FIG. 16B is a view of the mobile communication terminal 100-1 when it is opened by an angle of θ2-1, at approximately 180°. FIG. 16C is a view of the mobile communication terminal 100-1 when it is opened by an angle of θ3-1, in the range of 290° to 300°.

Figure 17:
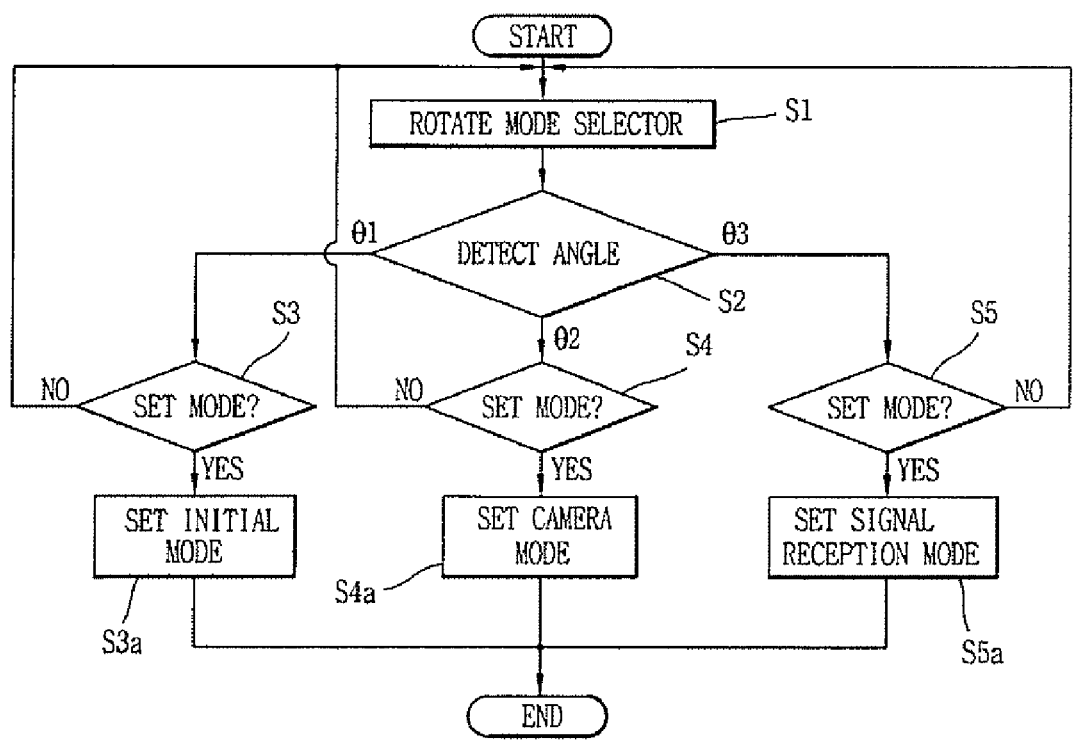
FIG. 17 is a flowchart showing a mode conversion method according to an embodiment of the present invention.

FIG. 17 is a flowchart illustrating an embodiment of a mode selection (conversion) method of a mobile communication terminal 100 in accordance with an aspect of the present invention.

In step S1, a user rotates the mode selector 310 of the mode conversion device 300 in order to select a desired operation mode of the mobile communication terminal 100. In this regard, the user can either first open the second body 110 of the mobile communication terminal 100 to the desired angle, or can first rotate the mode selector 310 of the mode conversion device 300 to the desired angle, and then rotate the second body 110 to the desired angle.

In step S1, the second body 110 can be opened to first angle θ1, second angle θ2, or third angle θ3. In the example shown in FIG. 17, the first angle θ1 corresponds to an initial mode, the second angle θ2 corresponds to a camera mode, and the third angle θ3 corresponds to a signal reception mode. However, the invention is not limited, of course, to these specific types of operation modes.

In step S2, the angle by which the mode selector 310 has been rotated is detected. If the mode selector 310 has been rotated by an angle of θ1, the process proceeds to step S3; if the mode selector 310 has been rotated by an angle of θ2, the process proceeds to step S4; and if the mode selector 310 has been rotated by an angle of θ3, the process proceeds to step S5.

In steps S3, S4 and S5, it is determined whether the user has slid the operator 320 into an operation mode setting position (i.e., whether the operator 320 is contacting the coupling member 330).

If, at step S3, it is determined that the user has moved the operator 320 into its operation mode setting position, then the process proceeds to step S3a, where the mobile communication terminal 100 switches into an operation mode corresponding to first angle θ1 (in this example, an initial mode). If, at step S4, it is determined that the user has moved the operator 320 into its operation mode setting position, then the process proceeds to step S4a, where the mobile communication terminal 100 switches into an operation mode corresponding to second angle θ2 (in this example, a camera mode). If, at step S5, it is determined that the user has moved the operator 320 into its operation mode setting position, then the process proceeds to step S5a, where the mobile communication terminal 100 switches into an operation mode corresponding to third angle θ3 (in this example, a signal reception mode).

However, if it is determined in steps S3, S4 or S5 that the operator 320 has not been slid into its operation mode setting position (i.e., is not contacting the coupling member 330), the process reverts back to step S1, where a user can rotate the mode selector 310 to select an operation mode.

The mobile communication terminal described above can be conveniently set to an operation mode at different configurations by which a second body is open with respect to a first body, and the second body can be held at a desired angle with respect to the first body.

Also, it should be noted that the embodiments described above are based upon a folder-type (clamshell) mobile terminal. However, the features of the present invention may also be applied to other types of mobile terminals. For example, the mode conversion device 300 (comprising a mode selector 310, an operator 320, and a coupling member 330) may be implemented for a slider type mobile terminal having a main body and a slider portion that can move on the main body. In such case, the mode selector 310 and the operator 320 may both be provided on the slider portion, while the coupling member 330 may be located along an edge of the main body.

Here, the slider portion may be moved in single direction or in multiple directions. For example, the slider portion may be moved up, down, or both up and down by the user. An appropriate detent mechanism may allow the slider portion to be (temporarily) fixed at one or more configurations for each slide direction. For example, the slider may be slide upward along the main body to thus be opened to a fully opened position and/or opened to one or more partially opened (or intermediate) positions.

To accommodate the multiple opened positions, two or more coupling members 330 may be provided along an edge of the main body. This would allow the operator 320 to be engaged with a corresponding protrusion for each opened position. For example, a fully opened position may be for watching TV broadcasts, while an intermediate opened position may be for placing or receiving voice calls.

The present invention provides a mobile communication terminal, comprising: a first body and a second body, rotatably coupled by a hinge assembly; and a mode selector that sets an operation mode of the mobile communication terminal, mode selector comprising: a rotation part that enables the detection of an angle between the first body and the second body, and a setting part, movably mounted on the rotation part, which sets an operation mode of the mobile communication terminal when the setting part is moved into contact with a holding part.

The mobile communication terminal may further comprise: a rotation angle control member, coupled to the rotation part, that stops a rotation of the rotating part at an angle corresponding to a predetermined operation mode; a stopper that stops a rotation of the rotation angle control member at an angle corresponding to the predetermined operation mode; and a rotation angle detector that detects an angle by which the rotation part rotates. The stopper may comprise: a case; an elastic member provided in the case; and a detent which abuts the elastic member, protrudes through the case and engages the rotation angle control member. A plurality of protrusions and grooves are formed along an edge of the rotation angle control member, and positions of the grooves correspond to angles at which the second body can be fixed with respect to the first body. The angles at which the second body can be fixed with respect to the first body comprise a first angle between 140° and 160°, a second angle between 170° and 180°, and a third angle between 300° and 360°. The angles at which the second body can be fixed with respect to the first body correspond to different operation modes of the mobile communication terminal. The different operation modes comprise an initial mode, a camera mode, and a signal reception mode. The mobile communication terminal may further comprise a controller that sets the operation mode of the mobile communication terminal. The controller may set the operation mode of the mobile communication terminal based on the angle detected by the rotation angle detector when the controller receives a signal that the setting part has moved into contact with the holding part. A slot may be formed on the rotation part, running from a center of the body to an end of the body, and the setting part comprises a slider that slides within the slot. The holding part may be provided at an end of one of the first body and the second body adjacent to the mode selector, and a groove is formed on the setting part, the holding part fitting within the groove to engage the setting part. The holding part and the setting part may form a switch. The hinge assembly may comprise a camera module.

Also, the present invention provides a method of selecting an operation mode of a mobile communication terminal, comprising: sensing rotation of a rotating part to a predetermined angle; detecting movement of a setting part into a set position; and setting the mobile communication terminal to an operation mode when the setting part is moved into the set position.

Rotating the rotating part may comprise rotating the rotating part to one of a plurality of predetermined angles. The plurality of predetermined angles may comprise a first angle between 140° and 160', a second angle between 170° and 180°, and a third angle between 300° and 360°. The first angle, the second angle, and the third angle correspond to respectively different operation modes of the mobile communication terminal. The different operation modes comprise an initial mode, a camera mode and a signal reception mode. The method may further comprise: detecting the rotation of the rotating part to the predetermined angle and determining the operation mode corresponding to the predetermined angle.

Additionally, the present invention comprises a computer-readable medium which stores a program for setting an operation mode of a mobile communication terminal, the program comprising: an angle determination code segment that determines an angle between a first body of the mobile communication terminal and a second body of the mobile communication terminal; an operation mode determination code segment that determines an operation mode corresponding to the determined angle; and an operation mode setting code segment that sets the mobile communication terminal to the determined operation mode.

Furthermore, the present invention provides a mobile terminal comprising: at least two body members operatively connected together and movable with respect to each other for achieving a closed-together configuration and various opened configurations; an operation mode setting unit located along an edge of at least one of the body members; and a controller cooperating with the operation mode setting unit for controlling operation of the mobile terminal in different selected operation modes, wherein the operation mode setting unit comprises: an adjustable selection knob for selecting an operation mode of the mobile terminal at the closed-together configuration or the various opened configurations, and a latching mechanism operatively connected with the selection knob for activating a selected operation mode when the latching mechanism is engaged and de-activating the selected operation mode when the latching mechanism is disengaged.

The latching mechanism may comprise: a movable latch located on a first one of the body members; and a protrusion, located on a second one of the body members, with which the movable latch may be engaged or disengaged, wherein the movable latch and the protrusion, when engaged together, provide additional structural support for the closed-together configuration or the various opened configurations. The closed-together configuration may be achieved when the first and second body members overlie one another. The opened configuration may be achieved when the first and second body members are displaced relative one another. The terminal may further comprise: a detector cooperating with at least one of the movable latch and the protrusion for detecting the engaging or disengaging in a contact or contact-less manner for activating or de-activating of the selected operation mode. The first and second body members may be operatively connected together at the operation mode setting unit. The operation mode setting unit may further comprise a detent unit that allows the body members to be temporarily fixed at a desired closed or opened configurations. The first and second body members may be operatively hinged together via a hinge mechanism. The hinge mechanism may comprise a detent unit that allows the body members to be fixed at various positions relative one another for achieving a desired closed-together or opened configuration.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

In accordance with various embodiments of the present disclosure, the methods described herein may be implemented by software programs executable by a processor. The present disclosure contemplates a computer-readable medium that includes instructions or receives and executes instructions responsive to a propagated signal. The term "computer-readable medium" shall include any medium that is capable of storing, encoding or carrying a set of instructions for execution by a processor to perform any one or more of the methods or operations disclosed herein.

In a particular non-limiting, exemplary embodiment, the computer-readable medium can include a solid-state memory such as, for example, a memory card or other package that houses one or more non-volatile read-only memories. Further, the computer-readable medium may be a random access memory or other volatile re-writable memory. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile terminal comprising:
at least two body members operatively connected together and movable with respect to each other for achieving a closed-together configuration and various opened configurations; and
an operation mode setting unit located along an edge of at least one of the body members; and
a controller cooperating with the operation mode setting unit for controlling operation of the mobile terminal in different selected operation modes,
wherein the operation mode setting unit comprises:
an adjustable selection knob for selecting an operation mode of the mobile terminal at the closed-together configuration or the various opened configurations, the adjustable selection knob mounted to one of the body members so as to be rotated when being manipulated; and
a latching mechanism operatively connected with the selection knob for activating a selected operation mode when the latching mechanism is engaged and de-activating the selected operation mode when the latching mechanism is disengaged,
wherein the latching mechanism comprises:
a movable latch located on the adjustable selection knob and configured to move on the adjustable selection knob when being manipulated; and
a protrusion, located on one of the first or second body members, with which the movable latch may be engaged or disengaged,
wherein the movable latch and the protrusion, when engaged together, provide additional structural support for the closed-together configuration or the various opened configurations.

2. The terminal of claim 1, wherein the closed-together configuration is achieved when the first and second body members overlie one another.

3. The terminal of claim 1, wherein the opened configuration is achieved when the first and second body members are displaced relative one another.

4. The terminal of claim 1, further comprising:
a detector cooperating with at least one of the movable latch and the protrusion for detecting the engaging or disengaging in a contact or contact-less manner for activating or de-activating of the selected operation mode.

5. The terminal of claim 4, wherein the first and second body members are operatively connected together at the operation mode setting unit.

6. The terminal of claim 5, wherein the operation mode setting unit further comprises a detent unit that allows the body members to be temporarily fixed at a desired closed or opened configurations.

7. The terminal of claim 4, wherein the first and second body members are operatively hinged together via a hinge mechanism.

8. The terminal of claim 7, wherein the hinge mechanism comprises a detent unit that allows the body members to be fixed at various positions relative one another for achieving a desired closed-together or opened configuration.

9. The terminal of claim 1, wherein the movable latch includes a groove having a size corresponding to a width of the coupling member for receiving the coupling member therein.

10. A mobile communication terminal comprising:
a first body and a second body rotatably connected via a hinge assembly for achieving a closed-together configuration and various opened configurations;
an operation mode unit located along an edge of at least one of the first and second bodies; and
a controller cooperating with the operation mode setting unit for controlling operation of the mobile communication terminal in different selected operation modes,
wherein the operation mode setting unit comprises:
an adjustable selection knob for selecting an operation mode of the mobile terminal at the closed-together configuration or the various opened configurations, the adjustable selection knob mounted to one of the first and second bodies so as to be rotated when being manipulated; and a latching mechanism operatively connected with the selection knob for activating a selected operation mode when the latching mechanism is engaged and de-activating the selected operation mode when the latching mechanism is disengaged, wherein the latching mechanism comprises:

a movable latch located on the adjustable selection knob and configured to move on the adjustable selection knob when being manipulated; and a protrusion, located on one of the first or second bodies, with which the movable latch may be engaged or disengaged, wherein the movable latch and the protrusion, when engaged together, provide additional structural support for the closed-together configuration or the various opened configurations.

11. The mobile communication terminal of claim 10, further comprising a detector cooperating with the at least one of the movable latch and the protrusion for detecting the engaging or disengaging in a contact or a contact-less manner for activating or de-activating of the selected operation mode.

12. The mobile communication terminal of claim 10, wherein the operation mode setting unit further comprises a detent unit that allows the first and second bodies to be temporarily fixed at a desired closed or opened configurations.

13. The mobile communication terminal of claim 10, further comprising a rotation angle control member mounted at a side surface of the adjustable selection knob for controlling a rotation of the adjustable selection knob so as to stop the first body and/or second body at an angle corresponding to a selected operation mode, wherein the rotation angle control member is constructed so as to have a plurality of protrusions and grooves alternately arranged along a circular edge so that the first body and the second body can be rotated in a first angle region, a second angle region, or a third angle region.

14. The mobile communication terminal of claim 13, wherein the first angle region has a range of 140~160°, the second angle region has a range of 170~180°, and the third angle region has a range of 300~360°.

15. The mobile communication terminal of claim 13, wherein the first angle region, the second angle region, and the third angle region are set to have different modes.

16. The mobile communication terminal of claim 15, wherein the first angle region corresponding to an initial mode, the second angle region corresponds to a camera mode, and the third angle region corresponds to a terrestrial signal or satellite signal receive mode.

17. The mobile communication terminal of claim 13, wherein a preset operation mode is outputted when the movable latch is coupled to the protrusion.

* * * * *